March 5, 1929. D. F. DOMIZI 1,704,358
COMBINED BORING, REAMING, AND TAPPING MACHINE
Filed Nov. 10, 1924 6 Sheets-Sheet 6
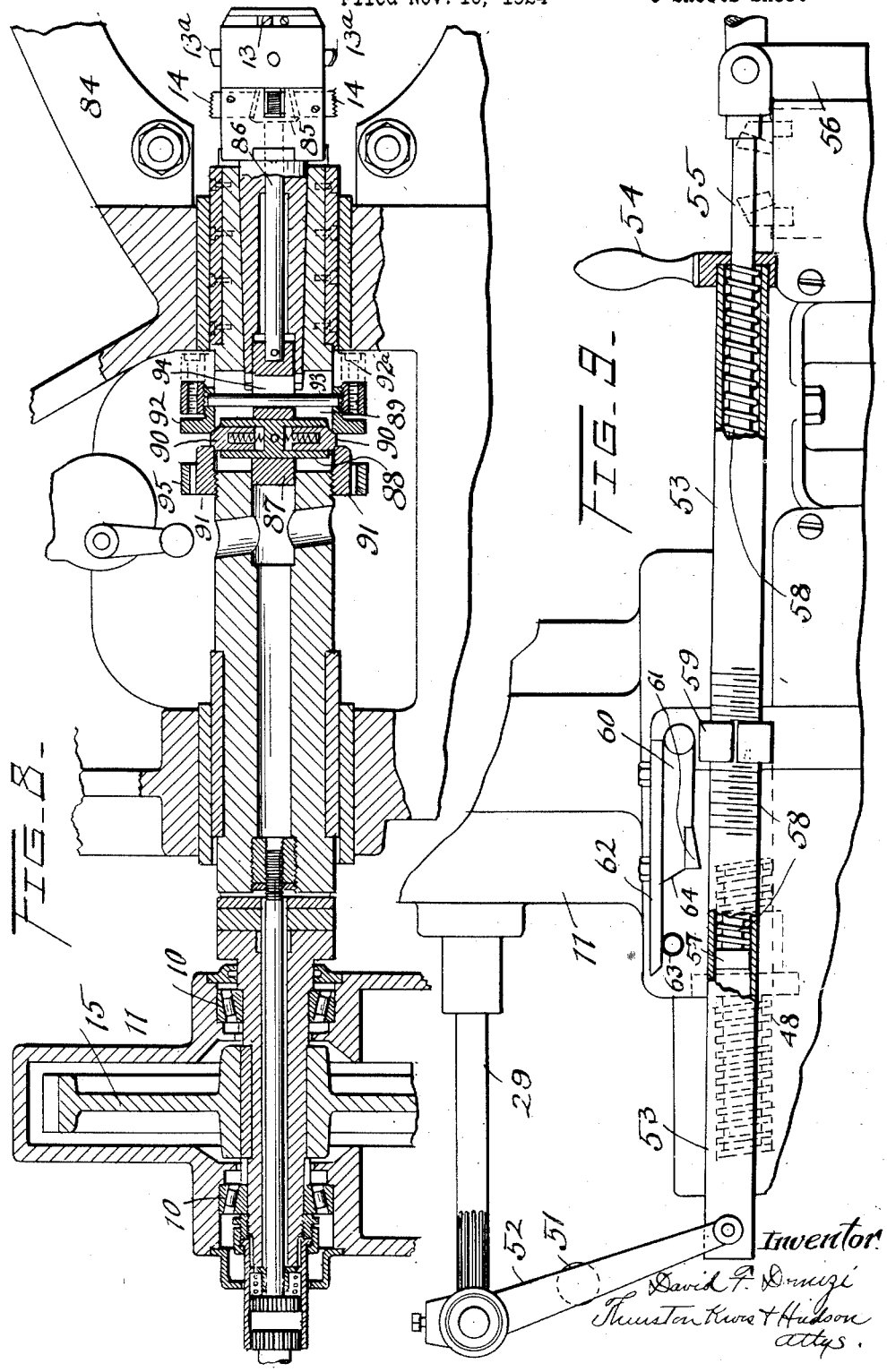

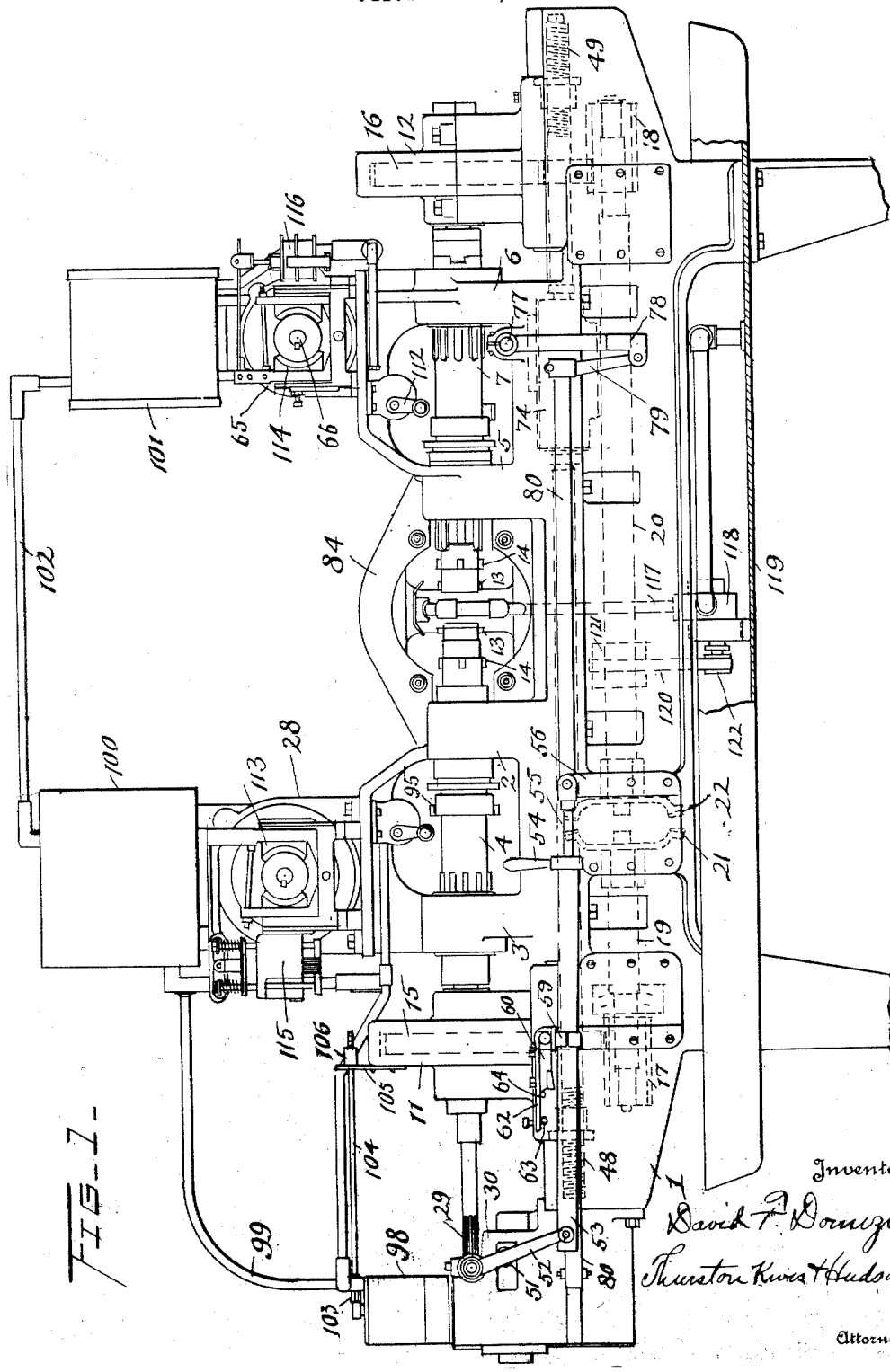

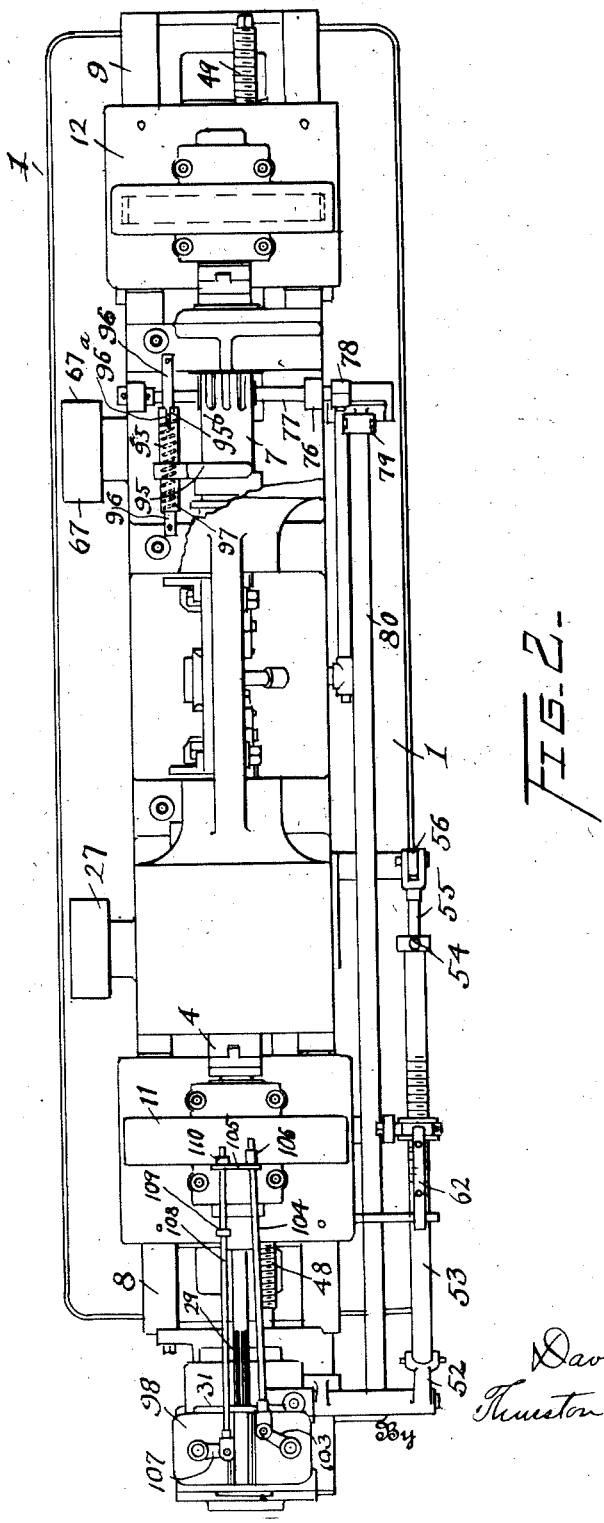

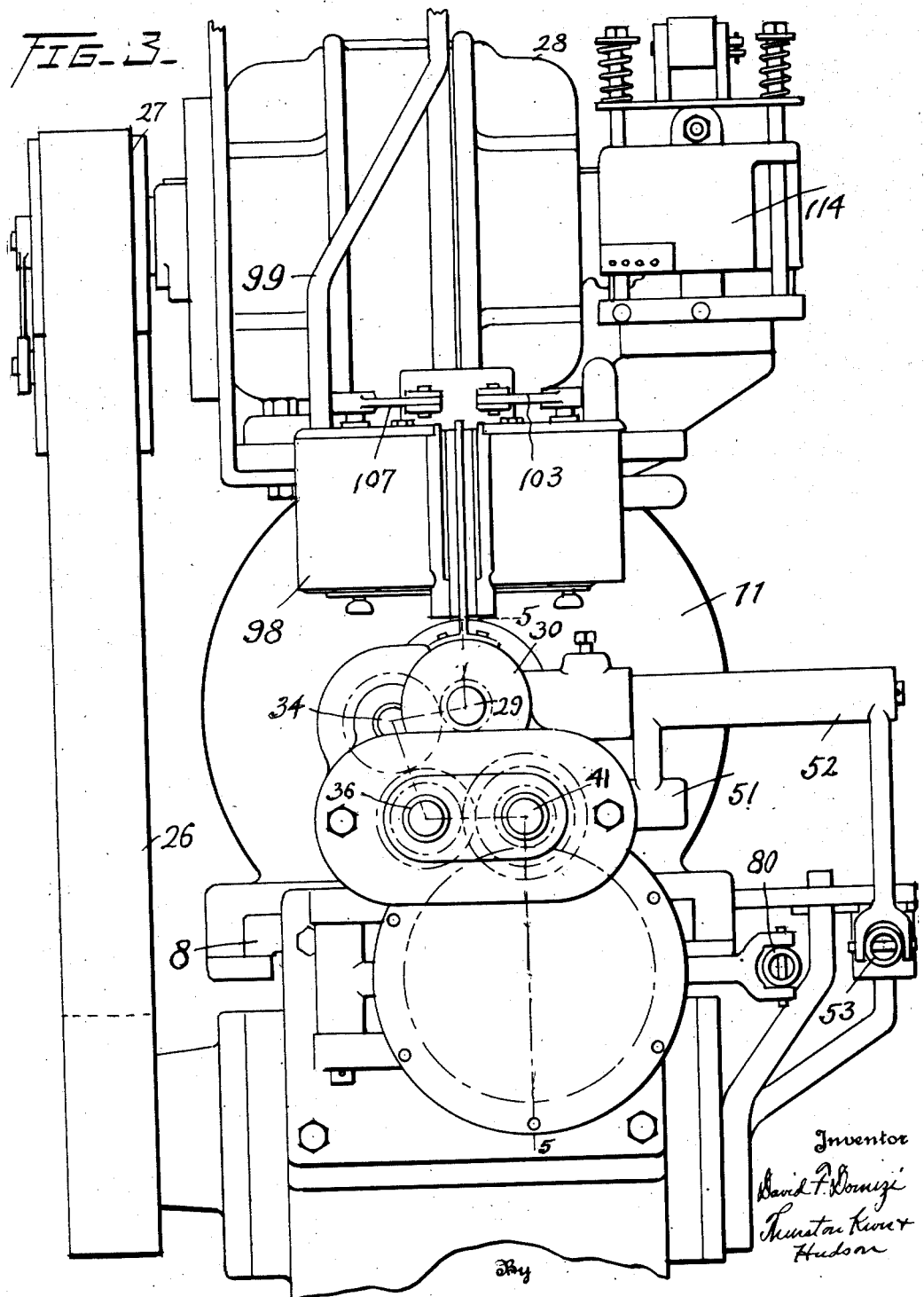

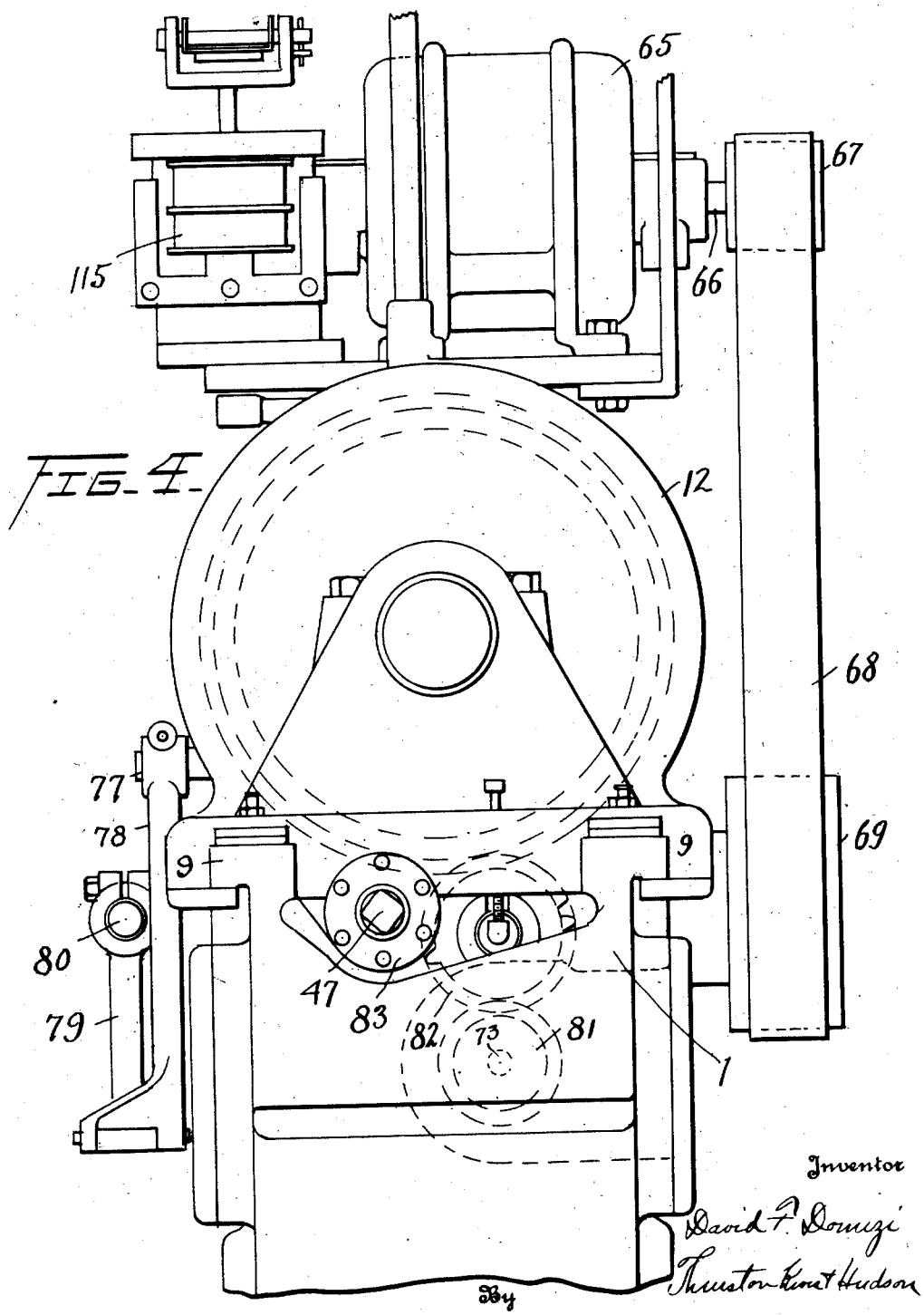

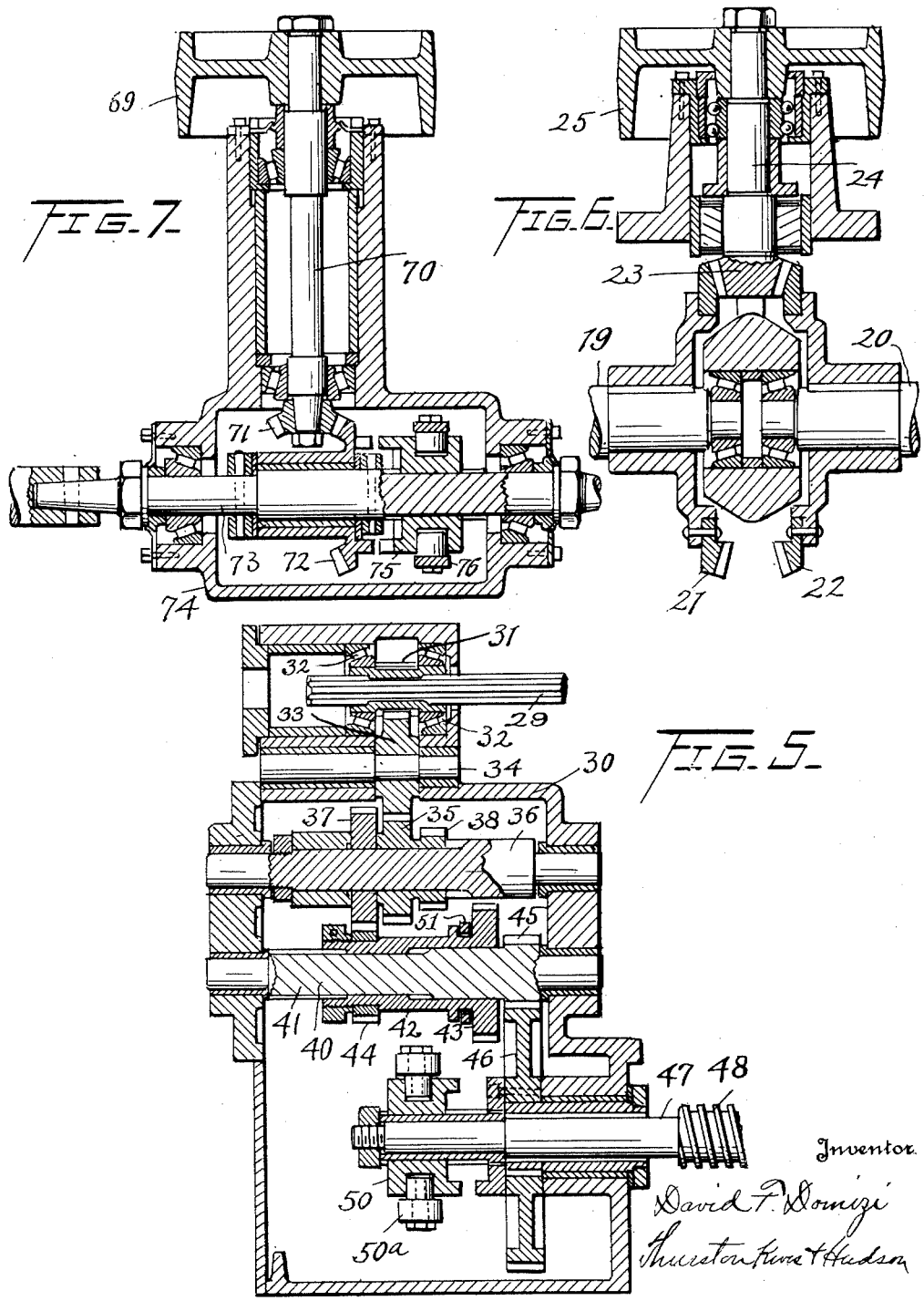

Patented Mar. 5, 1929.

1,704,358

UNITED STATES PATENT OFFICE.

DAVID F. DOMIZI, OF CLEVELAND, OHIO.

COMBINED BORING, REAMING, AND TAPPING MACHINE.

Application filed November 10, 1924. Serial No. 748,851.

The present invention is a combined boring, reaming and tapping machine adapted in one operation to bore and ream an opening in a casting of the desired internal diameter and to thread the opening. As herein disclosed the machine is designed to operate simultaneously upon a plurality of openings in a casting and to simultaneously bore, ream and tap said openings, the machine herein shown having been designed particularly for boring, reaming and threading the aligned openings in the ends of a differential gear shell or casing.

It is the object of the invention to provide a machine of the character described which is to a large extent automatic in operation, which is simple in construction and which efficiently performs the work for which it is intended.

More specific objects are to provide means for automatically changing the rate of feed of the spindle as the tapping operation begins, to provide for a rapid return movement of the spindles after the reaming and tapping operations are completed, to automatically release the tap prior to return movement of the spindle after the operation on the work is completed, and to automatically restore the taps to cutting position ready for the next operation. In addition, it is an object of the invention to provide a main motor for operating the spindles and for feeding the spindles toward the work and an auxiliary motor for retracting the spindles after the operation is completed, the two motors being so controlled as to operate in proper sequence.

With the above and other objects in view, the invention may be said to comprise the machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Fig. 1 is a front elevation of the machine; Fig. 2 is a top plan view of the machine with the auxiliary motor and its support omitted to show the spindle beneath the auxiliary motor; Fig. 3 is an end elevation of the machine looking toward the end on which the main motor and drive gearing are mounted; Fig. 4 is an end elevation of the machine looking toward the end thereof opposite that shown in Fig. 3; Fig. 5 is a sectional view showing the gearing for operating the feed screw shaft from one of the spindles, the section being taken as indicated by line 5—5 of Fig. 3; Fig. 6 is a section through the gearing for driving the two spindle drive shafts; Fig. 7 is a horizontal section showing the gearing through which the auxiliary motor is connected to the lead screw shaft; Fig. 8 is a detail view showing the yielding support for the trip yokes associated with the spindles; Fig. 9 is a fragmentary side elevation of the power controlling device.

Referring to the accompanying drawings, an elongated supporting bed 1 forms the support for the entire mechanism and, at one side of the longitudinal center thereof, the bed 1 carries two rigid standards 2 and 3 in which the horizontally disposed tool spindle 4 is rotatably and slidably journaled. On the opposite side of its longitudinal center, the supporting bed carries a second pair of vertical standards 5 and 6 in which the second tool spindle 7 is slidably and rotatably journaled. The two spindles 4 and 7 are supported in longitudinal alignment and are fed towards and from each other in the operation of the machine. At opposite ends of the bed 1 there are longitudinally disposed guideways 8 and 9 and the outer ends of the spindles 4 and 7 extend to adjacent the opposite ends of the bed. The projecting ends of the spindles 4 and 7 are journalled in thrust bearings 10 within gear casings 11 and 12 which form the spindle supporting heads and which are mounted to slide upon the guideways 8 and 9 respectively. As the gear casings 11 and 12 are moved back and forth along their guideways 8 and 9 the thrust bearings 10 cause the spindles 4 and 7 to move with the casings. As best shown in Fig. 8, the spindles 4 and 7 are provided with boring cutters 13 and reaming cutters 13[a] and outwardly of the reaming cutters each of the spindles is provided with taps 14 which project outwardly from the axis of the spindles slightly more than the cutters 13[a] so that they are adapted to thread the openings which have been reamed by the cutters 13[a].

For driving the spindles the spindle 4 has fixed thereto a large gear 15 within the casing 11 and the spindle 7 has fixed thereto a large gear 16 within the casing 12. These large gears 15 and 16 are in sliding mesh with elongated gears 17 and 18 which are fixed to longitudinally extending shafts 19 and 20 beneath the bed. The gears 17 and 18 are mounted upon the outer ends of the two aligned driving shafts 19 and 20 and these shafts at their inner ends have fixed thereto beveled gears 21 and 22 which are of the same size and are driven simultaneously in opposite directions at the same speed by a beveled gear 23 which meshes with both of said first mentioned beveled gears and is carried by a horizontally disposed shaft 24 extending transversely under the bed. (See Fig. 6). At its outer end on the rear side of the machine the shaft 24 has fixed thereto a belt pulley 25 which is driven by a belt 26 which extends from a pulley 27 on the shaft of the main operating motor 28. By means of the driving connections above described the spindles 4 and 7 are simultaneously driven in opposite directions and at the same speed from the main motor 28.

The spindle feed mechanism during the operation upon the work is driven from the spindle 4 and to drive the feed mechanism the spindle 4 has at its outer end a splined extension 29 which extends into a fixed gear casing 30 which is supported on the bed 1 outwardly of the sliding gear casing 11. Within the gear casing adjacent the top thereof there is a gear 31 which is journaled in thrust bearings 32 through which the splined extension 29 slides. The gear 31 being splined to the spindle extension 29 rotates therewith and drives a gear 33 which is fixed to a countershaft 34 and the gear 33 in turn drives a gear 35 which is keyed to a second countershaft 36. The countershaft 36 also carries a gear 37 at one side of the gear 35 and a smaller gear 38 upon the opposite side of the gear 35, the three gears 35, 37, and 38 being all splined to the countershaft 36. The third countershaft 40 is journaled in the casing adjacent the countershaft 36 and this countershaft has longitudinal grooves 41 which receive the internal ribs of a sleeve 42 which is thus slidably splined to the shaft. This sleeve 42 carries at one end a gear 43 which is adapted in one position of the sleeve to mesh with the gear 38 on the adjacent countershaft 36 and at its opposite end a smaller gear 44 which is adapted to mesh with the gear 37 on the shaft 36. The sliding sleeve 42 provides a gear shift by means of which the spindle feed mechanism may be driven at either of two different speeds. At one end thereof the countershaft 40 has formed thereon a small gear 45 which meshes with a large gear 46 which is rotatably mounted upon the lead screw shaft 47 which is provided with oppositely tapered screw portions 48 and 49 which engage with the slidable casings 11 and 12 respectively. The lead screw shaft 47 is adapted to be connected to the gear 46 by means of a slidable jaw clutch 50 which is splined to the shaft 47 and has clutch teeth adapted to engage with clutch teeth fixed to the gear 46. When the shaft 47 is driven through the gearing above described the two spindles 4 and 7 are moved toward each other at equal speeds, the gear shift above described providing means whereby the spindles are caused to move toward each other at a slower speed at the time the taps come into engagement with the work.

The shifting of the sleeve 42 to vary the speed of rotation of the feed screw shaft is accomplished by means of a shifter arm 51 carried by a lever 52 which is pivoted to the casing 30 at its upper end and to a tubular operating rod 53 at its lower end, the rod 53 being slidably supported upon the frame of the machine and having a handle 54 at the end thereof opposite that to which the arm 52 is pivoted by means of which it may be shifted to shift the gears within the casing. A rod 55 extends into the tubular operating rod 53 at the end carrying the handle 54 and this rod is pivoted to a post 56 which is fixed to the frame. The rod 55 has a head 57 on the end thereof within the tube 53 and a coiled spring 58 is interposed between the head 57 and the end of the tube 53 to which the handle 54 is attached. The rod 55 forms the support and guide for the tubular operating rod 53 and the coiled spring 58 serves to normally hold the rod 53 in a position in which the gear 38 is meshing with the larger gear 43 of the sleeve 42 and the spindle shaft 47 is driven at its lower speed. Intermediate its ends the rod 53 carries a collar 59 which is screw threaded thereon and adjustable lengthwise thereof and pivoted to the frame adjacent the rod there is a dog 60 which has an engaging portion 61 at its free end which drops behind the collar 59 when the rod is pushed forwardly in opposition to the spring 58, the collar 59 being so positioned that when the dog 60 is in engagement therewith, the sleeve 42 is held in the position in which the lead screw shaft is driven at its higher speed. Means are provided for automatically shifting the sleeve 43 at the instant at which the taps 14 come into engagement with the work. To provide for this automatic shifting the dog 60 has an extension 62 which rests upon a pin 63 fixed to the sliding casing 11 and this pin 63 during the inward movement of the spindle 4 engages the inclined forward end 64 of the dog 60 and lifts the same clear of the collar 59 whereupon the spring 58 acts upon the rod 53 to shift the same in a direction to connect the gearing for the lead screw shaft through the gears 38 and 43 to drive the lead screw shaft at the slower speed. The pin 63 is so positioned on the casing 11 that the rod 53 is released just at the time that the taps 14 begin their operation upon the work. The two speed drive permits a rapid reaming operation and also the correct feed movement for the tapping operation. Before the machine is started into operation, the operator by means of the handle 54, shifts the rod 53 in opposition to the spring 58 forwardly until the dog 60 engages with the collar 59 so that the feed screw shaft is operated at its higher speed until the gear shift is released by the pin 63 and causes the lead screws to be operated at a slower rate for the tapping feed.

The reverse movement of the spindles is effected by a reverse rotation of the lead screw shaft 47 and in this reverse movement the lead screw shaft is driven from an auxiliary motor 65 which is mounted upon a supporting stand carried by the standards 5 and 6 in which the spindle 7 is journaled. The auxiliary motor 65 has a shaft 66 upon which is fixed a belt pulley 67 on the rear side of the machine. The belt 68 runs over this pulley and drives the pulley 69 fixed to a shaft 70 which extends transversely beneath the bed. This shaft 70 as shown in Fig. 7 of the drawing carries a beveled pinion 71 which meshes with a beveled gear 72 which is rotatably mounted upon a shaft 73 which is geared to the lead screw shaft 47. The gears 71 and 72 as well as the clutch 75 by means of which the gear 72 may be clutched to the shaft 73 are enclosed within a housing 74 and the clutch 75 is engaged by a suitable shifter 76 by means of which it may be moved into and out of engagement with the gear 72. The clutch shifting arm 76 is fixed to a transverse shaft 77 extending across the bed above the casing 74 and this shaft has fixed thereto an operating arm 78 which extends downwardly from the shaft and is pivoted at its lower end to an arm 79 which is fixed at its upper end to a longitudinally extending connecting rod 80 which at its opposite end is connected to the shifter 50ª which operates the clutch 50 through which the lead screw shaft 47 is operably connected to a spindle. The two clutches 50 and 75 are thus moved simultaneously in opposite directions when the connecting rod 80 is shifted, this simultaneous movement causing one of these clutches to be engaged with its gear when the other is released. The rod 80 is so connected to the depending arm 78 that when the arm 78 is in vertical position the clutch member 50 is released and the clutch member 75 is engaged to drive the lead screw shaft 47 in a direction to withdraw the spindles from the work. Upon starting the machine the operator shifts the rod 80 to engage the clutch 50 which is held in engagement by friction until the main motor is stopped upon completion of the operation on the work whereupon the arm 78 will fall by gravity to vertical position automatically engaging the clutch 75 for the reverse movement of the spindles by the auxiliary motor. The drive from the shaft 73 to the lead screw shaft 47 is through a pinion 81 fixed to the shaft 73, an intermediate pinion 82 and a pinion 83 fixed to the shaft 47, the direction of rotation of the lead screw shaft when driven from the auxiliary motor being the reverse of its movement when driven from the spindle.

A work supporting frame 84 is detachably and rigidly secured to the frame between the spindle supporting standards 2 and 5 and the casting upon which the operations are performed is rigidly clamped to this work supporting member with the openings which are to be reamed and tapped in axial alignment with the spindles. The cutters 13 and 13ª are arranged in staggered relation adjacent the inner ends of the spindle and the taps 14 are mounted in the spindles adjacent the cutters 13ª but spaced therefrom just a sufficient distance to permit the reaming operation to be completed before the taps engage the work. To facilitate withdrawal of the spindles from the work and to permit the spindles to be rapidly moved out of engagement with the work, means is provided for automatically collapsing the taps before the spindles begin their return movement. To this end the taps 14 are slidably mounted in radial slots in the spindles and are held in their working position by a cone 85 at the inner end of a rod 86 which is slidably mounted within the spindle and is coaxial therewith. The mounting of the tools on the two spindles is exactly the same and a description of one will suffice for both. The rod 86 is connected at its outer end to a slide 87 which has a sliding fit within the hollow spindle and this slide 87 carries a transverse pin 88 which is hollow at its ends and slides in a slot 89 in the spindle. The length of the pin 88 is slightly less than the diameter of the spindle and this pin carries at the ends thereof spring pressed latches 90 which are adapted to engage with a collar 91 which is adjustably secured to the spindle, being screw threaded thereon. The collar 91 is so positioned that when the latches 90 engage with the inner end thereof, the cone 85 is held in its innermost position in which it holds the taps 14 in their outermost position. Inwardly of the collar 91 there is a second collar 92 which is loose upon the spindle and this collar carries a cross pin 93 which extends through the slot 89 of the spindle and through a slot 94 in the slide 87. A suitable filler ring 92ª may be provided between the collar 92 and the adjacent spindle supporting standard to position the collar 92 properly with respect to the spindle. The collar 92 is so positioned that as the spindle approaches the end of its working stroke the latches 90 engage with the collar 92 and are forced inwardly until they are freed from the collar 91 so that upon continued movement of the spindle the cone 85 is retracted and the taps 14 are freed from the work so that the threads are not stripped during return movement of the spindles. A yoke 95 carried by a sleeve 95ª, yieldably mounted upon a horizontal rod 96 fixed to the frame, straddles the collar 91. The sleeve 95ᵃ is held against turning movement on the rod 96 by means of a pin 96ᵃ which extends through the rod and engages longitudinally extending notches 95ᵇ in the sleeve. The yoke 95 engages with the collar 92 during the return movement of the spindle to restrain the movement thereof so that the forward end of the slot 94 is caused to engage with the cross pin 93 to shift the cone 85 into engagement with the taps to reset the same, the movement of the yoke 95 on the rod 96 being opposed by a spring 97 interposed between the pin 96ᵃ and the sleeve 95ᵃ. The inward movement of the slide 87 with respect to the spindle causes the latches 90 to be moved out of the collar 91 whereupon they spring to locking position in engagement with the inner edge of the collar 91 to lock the taps 14 in operating position. The filler ring 92ᵃ of each of the collars of the two spindles is removable and may be replaced by a filler ring of different thickness to provide for greater or less longitudinal movement of the taps in engagement with the work, depending upon the depth to which it is desired to thread the openings.

A controller casing 98 for the main motor 28 and auxiliary motor 65 is mounted upon the top of the gear casing 30 and suitable conductors extend from this casing through a conduit 99 to a switch casing 100 mounted above the main motor, and a similar switch casing 101 mounted above the auxiliary motor 65 has suitable electrical connections extending through the conductor conduits 102 and 99 to the controller casing 98. The specific motor control switches and circuits being old and well known they are not shown in detail herein. A controlling arm 103 for the main motor is mounted for horizontal swinging movement upon the top of the casing 98. This controlling arm has pivotally connected thereto an operating rod 104, the inner end of which extends through and is slidable in a stop plate 105 rigidly attached to the gear casing 11. At its inner end the rod 104 has a nut 106 which engages with the stop plate as the casing 11 approaches the end of its inward movement causing the controller arm 103 to be shifted to stop the main motor, the nut 106 being adjusted on the rod 104 to a position such that the main motor is stopped upon the completion of the tapping operation. A second controller arm 107 mounted upon the top of the casing 98 controls the operation of the auxiliary motor 65. This controller arm 107 is connected to a rod 108 which extends through the stop plate 105 and carries adjustable stop nuts 109 and 110 which engage opposite sides of the plate 105 the stop nut 109 serving to shift the controller 107 to stop the motor 65 when the return movement of the spindles is completed and the stop 110 being positioned to shift the controller arm 107 to start the motor 65 in operation at the same time that the controller 103 is shifted to stop the main motor 28. Thus when the machine is started in operation, the spindles are advanced to the work and rotated by the main motor 28 and upon completion of the working stroke the main motor is automatically stopped and the reverse motor started in operation to return the spindles to their original position. In addition to the automatic control above described, a hand controller is provided for the motor 28 and a hand controller 112 is provided for the auxiliary motor 65. The auxiliary hand controllers for the motor are in series with the switches operated by the controller arms 103 and 107 and permit the stopping of either motor in any position of the spindles whenever it is desirable to stop the spindles in an intermediate position.

It is desirable that each of the motors be stopped instantly when its circuit is broken and to accomplish this, the motor 28 is provided with a brake 113 and the motor 65 with a similar brake 114, the brakes 113 and 114 being operated by solenoids 115 and 116 which are energized simultaneously with the interruption of current to the motor. The motors 28 and 65 are directly controlled by switches within the casings 100 and 101 and these switches also operate to energize the brake actuating solenoids upon interruption of the current to the motor, the operation motor and brake controlling switches being controlled by the manually and automatically operated switches which control the current to solenoids which actuate the switches. The motor and brake operating switches are of a standard type which can be purchased in the open market and have therefore not been illustrated. The motor 28 is operable in one direction only but the motor 65 is preferably operable in either direction so that the spindles may be moved in or out without rotation when desired, the controlling switches for the motor 65 being adapted to cause operation thereof in either direction.

A suitable lubricant is supplied to the work by means of a pipe 117 through which the lubricant is forced by a pump 118 from a large drip pan 119 beneath the bed, the pump 118 being driven by a belt 120 which extends from a pulley 121 on the shaft 20 to a pulley 122 on the pump shaft.

Having described my invention, I claim:

1. In a machine of the character described, a work holder, a rotatable spindle mounted for movement longitudinally toward and from the work, cutters and taps carried by the spindle at longitudinally spaced points thereon and adapted to successively engage the work as the spindle is fed toward the work, said cutters being positioned to engage the work before the taps, means for driving the spindle and for feeding the same toward and into the work, and means for automatically varying the speed of the feed movement of the spindle after the cutters have performed their operation and as the taps are brought into engagement with the work.

2. In a machine of the character described, a work holder, a rotatable spindle mounted for movement longitudinally toward and from the work, cutting tools mounted on the spindle at longitudinally spaced points thereon for successively engaging the work, means for driving the spindle, a lead screw for feeding the spindle, means for driving the lead screw, and means associated with said last mentioned means for automatically changing the speed of rotation of the lead screw as one of the cutting tools is brought into engagement with the work.

3. In a machine of the character described, a work holder, a rotatable spindle mounted for movement toward and from the work, a plurality of sets of cutters carried by the spindle and spaced longitudinally thereof, said cutters being adapted to successively engage the work, means for driving the spindle and for feeding the same to the work, and means operating automatically at a predetermined point in the movement of the spindle toward the work to vary the speed of the feed movement substantially simultaneously with the engagement of the second set of cutters with the work.

4. In a machine of the character described, a fixed work holder, a rotatable spindle mounted for movement toward and from the work, a plurality of sets of cutters carried by the spindle and spaced longitudinally thereof to successively engage the work, means for driving the spindle, mechanism for feeding the spindle toward the work, said mechanism including a shiftable speed changing device, and means movable with the spindle for operating said speed changing device substantially simultaneously with the engagement of the second set of cutters with the work.

5. In a machine of the character described, a work holder, a rotatable spindle mounted for movement longitudinally toward and from the work, a motor, driving connections from the motor to the spindle, a spindle shifting device, means for driving said device from said motor to feed the spindle toward the work, an auxiliary motor, driving connections from said auxiliary motor to said spindle shifting device to operate the same to withdraw the spindle from the work, and means controlled by movements of the spindle for stopping the first mentioned motor and for starting and stopping the auxiliary motor.

6. In a machine of the character described, a work holder, a rotatable spindle mounted for movement toward and from the work, a spindle shifting device, a motor, driving connections from said motor to said spindle and to said spindle shifting device, means operating automatically to render said motor inoperative upon completion of the feed movement of the spindle, an auxiliary motor, and connections from said auxiliary motor to said spindle shifting device to operate the same to withdraw the spindle from the work.

7. In a machine of the character described, a work holder, a rotatable spindle, a shiftable support for the spindle, mechanism cooperating with said support and operable when driven in one direction to feed the support toward the work and when driven in the opposite direction to move the support away from the work, said mechanism including speed changing means, a motor for driving said mechanism in one direction, a separate motor for driving said mechanism in the opposite direction, and automatic controlling means for the speed changing means operative during movement of the mechanism in one direction and inoperative during reverse movement.

8. In a machine of the character described, a work holder, a rotatable spindle mounted for movement longitudinally toward and from the work, means for driving the spindle mechanism for shifting the spindle toward and from the work, a motor for driving said mechanism in one direction to feed the spindle to the work, a separate motor for driving said mechanism in the opposite direction to withdraw the spindle from the work, and controlling means for said separate motors operable to render one inoperative as the other is rendered operative.

9. In a machine of the character described, a work holder, a rotatable spindle carrying longitudinally spaced cutters and taps, the cutters being positioned to engage the work before the taps, means for driving said spindle, mechanism for feeding the spindle to the work including a shiftable speed changing device, and means controlled by the feed movement of the spindle for shifting said speed changing device to vary the feed movement of the spindle, as the taps are brought into engagement with the work.

10. In a machine of the character described, a supporting bed, a work holder intermediate the ends thereof, longitudinally extending guideways on opposite sides of the work holder, supports movable in said guideways, axially aligned spindles carried by said supports, each spindle having two spaced sets of cutters positioned to successively engage the work, the cutters being so positioned on the spindles that the corresponding sets of cutters on the spindles simultaneously engage the work, means for driving said spindles in opposite directions and at equal speeds, a shaft having oppositely inclined screws thereon engaging said supports, means for driving said shaft in opposite directions, and means for automatically varying the speed of rotation of said shaft simultaneously with the engagement of the second set of cutters on the spindles with the work.

11. In a machine of the character described, a supporting bed having a work holder thereon intermediate its ends and longitudinally extending guideways on opposite sides of the work holder, supports movably mounted in said guideways, spindles carried by said supports, mechanism connected to said supports, said mechanism when driven in one direction operating to move said supports toward the work holder and when driven in the opposite direction to move the supports away from the work holder, a motor, driving connections from the motor to the spindles, a driving connection from one of the spindles to the support shifting mechanism, an auxiliary motor, a driving connection from said auxiliary motor to said shifting mechanism, and interconnected clutches controlling the two drives for the support shifting mechanism.

12. In a machine of the character described, a supporting bed, a pair of supports on the bed mounted for movement longitudinally thereof, a work holder between the supports, spindles carried by the supports, reaming and tapping elements carried by the spindles at their inner ends for successive engagement with the work, the reaming elements being positioned to engage the work in advance of the tapping elements, means for driving the spindles from a common source of power, a mechanism for shifting said supports toward and from each other, means for driving said shifting mechanism in opposite directions and at either of two speeds, and means operative during movement of the supports toward each other controlled by a predetermined movement of the supports for changing the speed of the shifting mechanism simultaneously with the engagement of the tapping elements with the work.

13. In a machine of the character described, a supporting bed, a pair of supports on the bed mounted for movement longitudinally thereof, a work holder between said supports, spindles carried by said supports, a motor, driving connection from said motor to the spindles, mechanism for shifting said supports to and from each other, means for driving said mechanism from said motor in a direction to feed the spindles to the work, a second motor, driving connections from said second motor to said mechanism to operate the same in the opposite direction to withdraw the spindles from the work, and means controlled by the movements of the spindles for controlling the operation of said motors.

14. In a machine of the character described, a supporting bed, a pair of supports mounted for movement longitudinally thereof, axially aligned spindles carried by said supports, means for driving said spindles at equal speeds and in opposite directions, a lead screw shaft having oppositely inclined screw portions engaging the supports, gearing connecting said shaft with one of said spindles to drive said shaft in a direction to feed the spindles to the work, said gearing including a shiftable speed changing device, means operating upon a predetermined movement of the spindle supports to shift said speed changing device, a second motor, driving connections from said motor to said shaft to rotate the same in a direction to withdraw the spindles from the work.

15. A double end reaming and tapping machine comprising a pair of axially aligned longitudinally shiftable spindles, reaming and tapping elements carried on the inner end portions of said spindles, the reaming elements being positioned to engage the work before the tapping elements, means for supporting a piece of work between the inner ends of the spindles, means for rotating the spindles and simultaneously feeding them into the work, and means for automatically changing the speed of feed movement simultaneously with the engagement of the taps with the work.

16. In a machine of the character described, a pair of axially aligned longitudinally movable spindles, cutters upon the inner ends of the spindles, taps upon the inner end portions of the spindles, and spaced outwardly from the cutters, means for holding a piece of work between the inner ends of the spindles, driving means for simultaneously rotating the spindles and for feeding the same toward the work, means controlled by the feed movement of the spindles to vary the rate of feed, and separate driving means for withdrawing the spindles from the work simultaneously with the engagement of the taps with the work.

17. In a machine of the character described, a pair of axially aligned longitudinally movable spindles, cutters and taps upon the inner ends of the spindles, means for holding the work between the inner ends of the spindles, spindle operating and shifting means comprising a motor and gearing operated by the motor for simultaneously rotating the spindles and feeding them toward the work, means associated with said gearing and controlled by the feed movement of the spindles for varying the rate of feed, a second spindle shifting means comprising a second motor and gearing driven by said second motor for withdrawing the spindles from the work, and means whereby said spindle shifting means are caused to operate alternately.

In testimony whereof, I hereunto affix my signature.

DAVID F. DOMIZI.